United States Patent [19]
Dirksen

[11] Patent Number: 5,815,498
[45] Date of Patent: Sep. 29, 1998

[54] TRANSMISSION SYSTEM FOR ATM CELLS THROUGH A PASSIVE LOCAL NETWORK

[75] Inventor: Mark Johannes Gerardus Dirksen, Leidschendam, Netherlands

[73] Assignee: Koninklijke PTT Nederland N.V., Groningen, Netherlands

[21] Appl. No.: 544,210

[22] Filed: Oct. 17, 1995

[30] Foreign Application Priority Data

Oct. 14, 1994 [NL] Netherlands .......................... 9401697

[51] Int. Cl.$^6$ ............................ H04L 12/28; H04L 12/56
[52] U.S. Cl. .......................... 370/395; 370/401; 370/905
[58] Field of Search .................................. 370/392, 397, 370/236, 253, 252, 391, 396, 395, 905, 911, 450, 338, 401

[56] References Cited

U.S. PATENT DOCUMENTS 5,457,684 10/1995 Bharucha et al. ...................... 370/395

FOREIGN PATENT DOCUMENTS 0 632 614 A1  1/1995  European Pat. Off. .

OTHER PUBLICATIONS

J.D. Angelopoulos et al; "A Distributed FIFO Spacer/Multiplexer for Access to Tree APONs"; May 1, 1994; pp. 70–74; 1994 IEEE.

T. Toniatti et al; "Performance of Shared Medium Access Protocols for ATM Traffic Concentration"; Mar.–Apr. 1994; pp. 91–98; European Transactions on Telecommunications and Related Technologies, vol. 5, No. 2.

*Primary Examiner*—Wellington Chin
*Assistant Examiner*—Melissa Kay Carman
*Attorney, Agent, or Firm*—Frishauf, Holtz, Goodman, Langer & Chick

[57] ABSTRACT

A transmission method for ATM cells presented by local stations to a central station, and for ATM cells presented by the central station to the local stations, wherein a cell destined for the central station is stored in a cell buffer of one of the local stations and a first character is written to a register of the local station when the cell destined for the central station is presented in the local station. A second character is written to the register of the local station when an empty time slot is present in the local station. The register of each of the local stations are periodically read, and contents of the read local registers of the local stations are transmitted to the central station as register codes. Permit codes are transmitted from the central station to the local stations based on a location of the first characters in the registers, with the permit codes signifying permission to transmit a cell during a specific time slot.

1 Claim, 4 Drawing Sheets

5,815,498

TRANSMISSION SYSTEM FOR ATM CELLS THROUGH A PASSIVE LOCAL NETWORK

BACKGROUND OF THE INVENTION

The invention relates to a transmission system for ATM cells presented by local stations to a central station, and for ATM cells presented by said central station to the local stations.

The problem in this context is that, on the one hand, cells which arrive first, no matter at which local station, must also be transmitted first to the central station (FIFO: first in, first out); on the other hand, particularly if use is made of the same medium over at least part of the transmission section, for example in passive optical subscriber networks, the transmission moment has to be governed from the central station, in order to avoid a collision in the common section. It is therefore an object of the invention to provide a governing mechanism which results in ATM cells which are presented to the local stations being transmitted to the central station in order of arrival, but controlled in such a way that no collision occurs in the process.

SUMMARY OF THE INVENTION

The invention provides a simple, but effective registration of the moments of arrival of cells at the various local stations and periodic transmission of said registration. Furthermore, it provides processing of said information in such a way on the side of the central station that, at the same time as ATM cells are dispatched to the local stations, "permits" are despatched with them, which ensure that no collision occurs and the FIFO requirement is met.

The invention will be explained hereinafter in more detail with reference to a few figures.

DESCRIPTION OF THE FIGURES

FIG. 1 shows a number of local or subscriber stations 1 ... 4 which are connected, via a passive optical network formed by glass fibres 5, a passive coupler/splitter 6 and a glass fibre 7—common to the subscriber stations—to a central station 8 which gives access to a network. Each subscriber station may be presented with ATM cells which can be transmitted to the central station. At the same time, ATM cells can be transmitted from the central station to the subscriber stations; these cells are then presented to all subscriber stations, each subscriber station picking up only cells intended for that station and passing them on. Cells which are presented by a subscriber at his subscriber station and are intended for the central station are buffered in that subscriber station in a cell buffer, pending a dispatch permission code (permit) to be emitted by the central station. In order to notify the central station of the fact that the subscriber station wants to dispatch a cell, a code has to be sent to the central station. Were such a code to contain no more information than the simple message that subscriber station number such and such has received a cell and wishes to dispatch it, the central station would not be able to take into account the time of presentation of said cell, or rather the times of presentation of different cells in different subscriber stations. Consequently, a cell which had been presented early on at the one subscriber station could not be given priority above a cell presented subsequently at another subscriber station. Since this "FIFO" principle is desirable from a performance point of view—after all, this is how any accumulation of cells is forestalled—provision is made according to the invention for timing information indeed to be transmitted, and that this takes place in a simple, but effective manner. As a matter of fact, not only is a code generated if an ATM is presented during a time slot, but also if a time slot is empty: in the case of an empty time slot, a code "0" is generated, and a code "1" in the case of a time slot filled with a cell. Thus a code sequence is formed, the CAB string, which reflects the times of arrival of successive cells. If, as presented in FIG. 1 in subscriber station 1, out of twenty successive time slots a cell was presented only on the fourth, eleventh, thirteenth, eighteenth and nineteenth time slot, this is represented by the CAB string "01100001010000001000". This string consists of 0-bits, except at the fourteenth, eleventh, thirteenth, eighteenth and nineteenth location (from right to left). As long as the cells—five in total—cannot be dispatched, they are buffered in a cell buffer. Similarly FIG. 2 depicts, next to the subscriber stations 2 . . . 4, the CAB strings "01010000000000011000", "00000100000101000000" and "00100010000010000100" which are stored in registers (the time slot sequences to which these CAB strings relate are shown later on in FIG. 2). The cells themselves are buffered in the cell buffers in the various subscriber stations. The various CAB strings are sent to the central station during one or possibly several time slots. In the course of the discussion of FIG. 4, transmission of the CAB strings will be dealt with in more detail. FIG. 2 shows, as supplementary information to what was already shown in FIG. 1, the time slots, of the various subscriber stations, which form the basis of the CAB strings. Here it can be clearly seen that the CAB strings reflect said time slots: empty time slots are represented by a "0" in the CAB string; filled time slots by a "1", the location of the "1"—bits being an indication for the time of arrival of the cells.

FIG. 3 shows the processing, on the side of the central station, of the CAB strings of the different subscriber stations. From right to left, bitwise detection takes place of the corresponding bit values of the different CAB strings. In a), the status at slot time t is examined: all four bit values are "0", and therefore, at time t, no cell was being presented at any of the four subscriber stations. In b), the status at slot time t+1 is examined: at that time, likewise, no cell was being presented. At time t+2, represented by c), a cell was being presented only at subscriber station 4; this was therefore the first cell in the period under consideration (t . . . t+19). At the subsequent times, t+3, t+4, etc., cells were successively presented to subscriber stations 1 and 2, none, to subscriber station 2, to subscriber station 3, to station 4, to station 3, none, to station 1, none, to station 1, to station 4, to station 3, none, to station 2, to stations 1 and 4, to stations 1 and 2 and finally none. The action steps a) . . . t) therefore result in the detection of cells at successive times at the stations —(=no cell; empty time slot), —, 4, 1 and 2, —, 2, 3, 4, 3, —, 1, —, 1, 4, 3, —, 2, 1 and 4, 1 and 2, —.
If a cell was being presented at the same point in time to more than one station, the determining factor for defining the sequential order of station number is the value of the station number (an inherently better mechanism, although somewhat more difficult to implement, would be to perform a "random" selection from said station serial numbers). The sequence of SACs now becomes —, —, 4, 1, 2, —, 2, 3, 4, 3, —, 1, —, 1, 4, 3, —, 2, 1, 4, 1, 2, —. These SACs are transmitted to the local stations via the preambles of the downstream time slots. This transmission of SACs will be dealt with in more detail during the discussion of FIG. 4.

FIG. 1 shows a representation of FIG. 4 in reduced form at the central station. The subscriber station access codes are received in the subscriber stations, and the ATM cells present in the cell buffers are transmitted to the central station in the sequential order prescribed by the access codes. In this manner the desired FIFO principle is therefore entirely maintained.

FIG. 4 shows in detail the transmission of CABs from the subscriber stations to the central station and the transmission of SACs from the central station to the subscriber stations.

Upstream, the CABs are transmitted to the central station by means of CAB strings. Per time slot, four CAB strings, from four local stations, can be transmitted. For each CAB string, 110 bits are reserved. Each CAB string starts with a preamble of 16 bits, required, inter alia, for the detection of the ATM cells (see also Patent Application NL 9301156 in the name of Applicant). The CAB string proper in practice comprises 72 bits (the figures show CAB strings of 20 bits), followed by a check string of 12 bits. A further 10 bits are reserved. When the CAB strings from the local station arrive in the central station, they are read and processed in the abovedescribed manner to give SACs.

Figure 1:
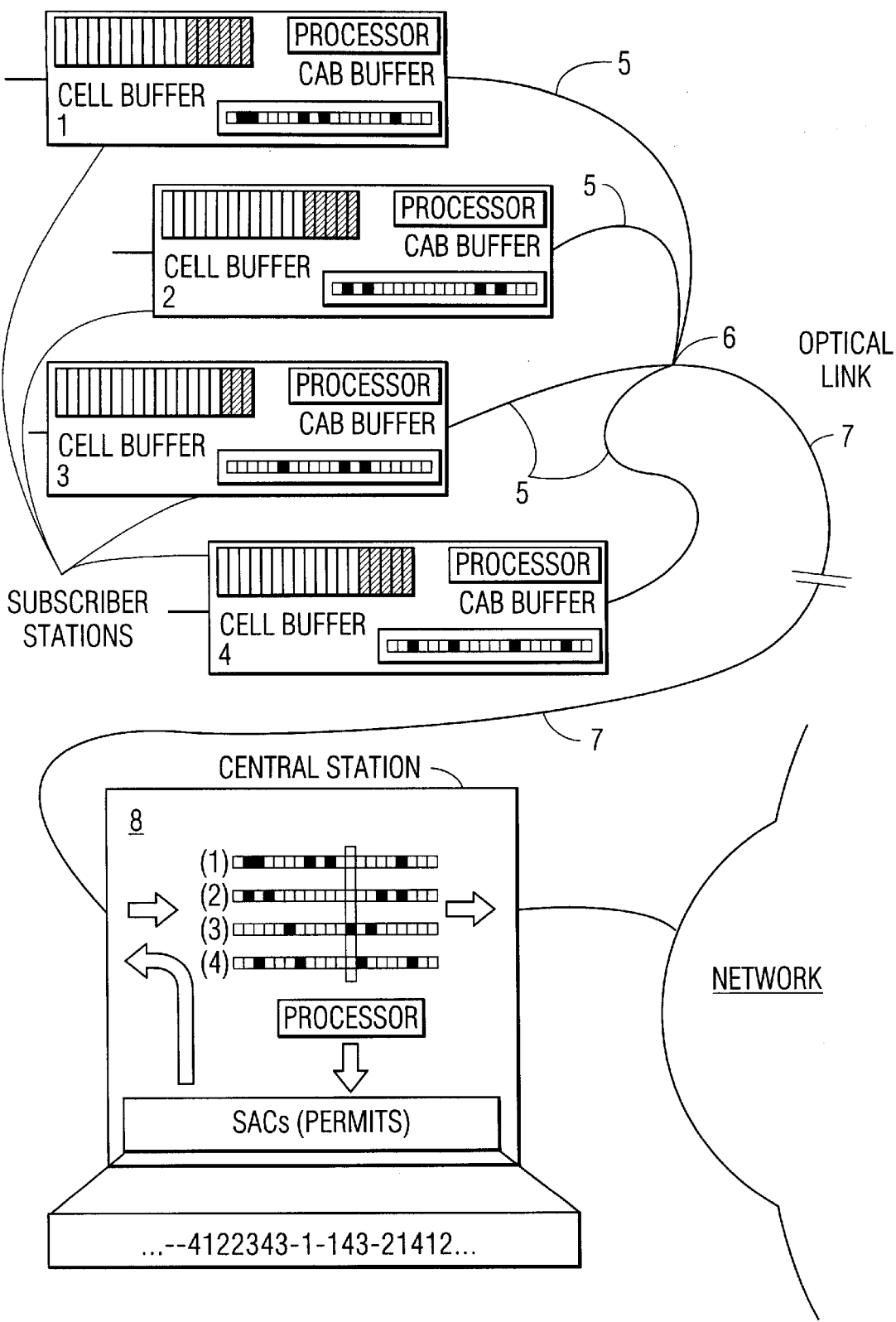
FIG. 1 shows four subscriber stations which are connected to a central station via a passive optical link.
Figure 2:
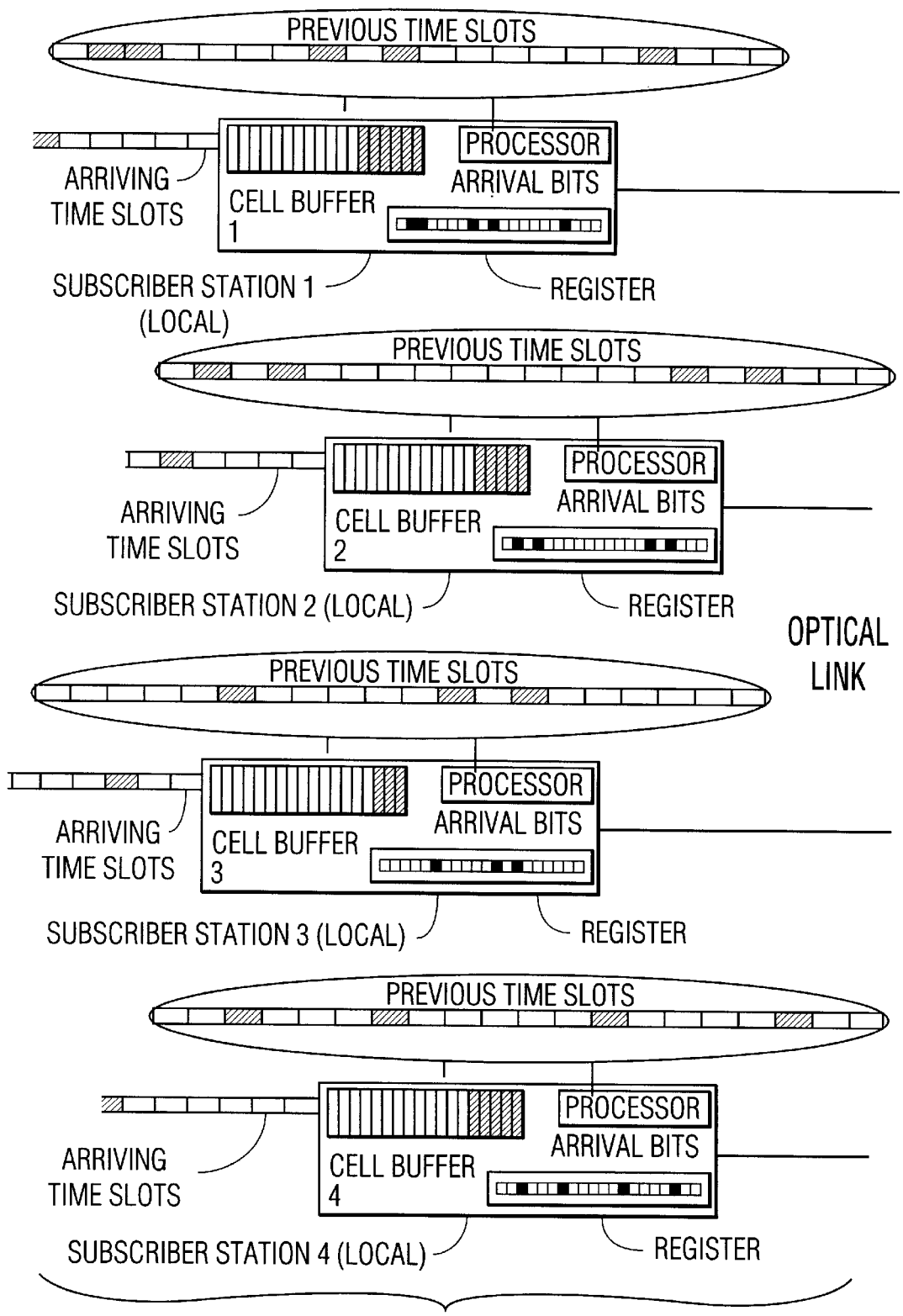
FIG. 2 schematically shows how ATM cells are buffered and the arrival times in the subscriber stations are registered by means of a string of cell arrival bits (CABs) being generated.
Figure 3:
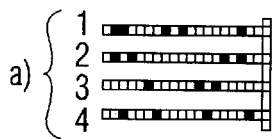
FIG. 3 shows how—after transmission of the CAB strings—the CAB strings from the various local stations are processed in the central station to give subscriber access codes (SACs, "permits").
Figure 3:
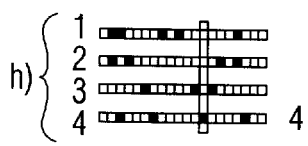
Figure 3:
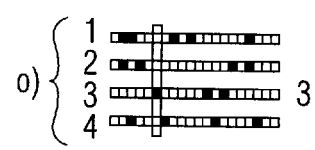
Figure 3:
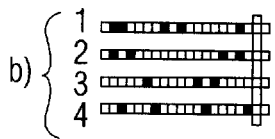
Figure 3:
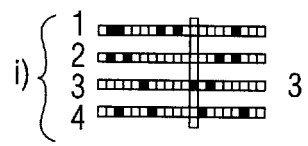
Figure 3:
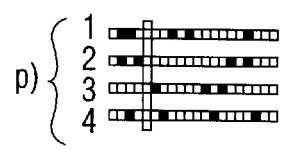
Figure 3:
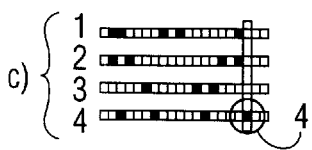
Figure 3:
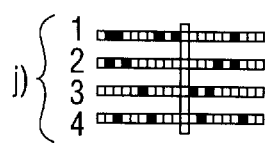
Figure 3:
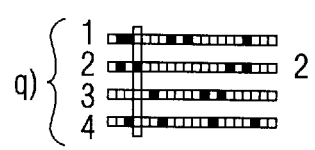
Figure 3:
Figure 3:
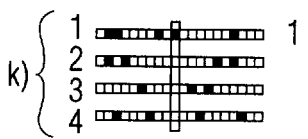
Figure 3:
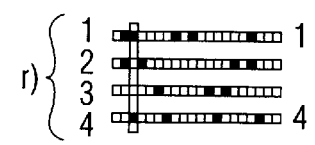
Figure 3:
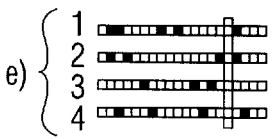
Figure 3:
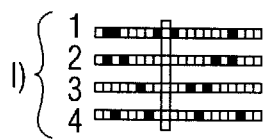
Figure 3:
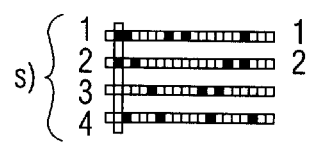
Figure 3:
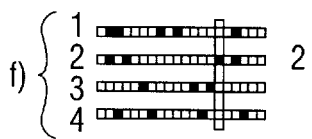
Figure 3:
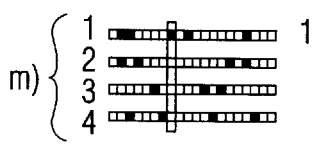
Figure 3:
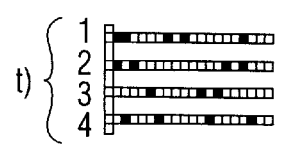
Figure 3:
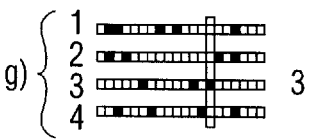
Figure 3:
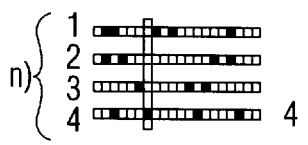
Figure 4:
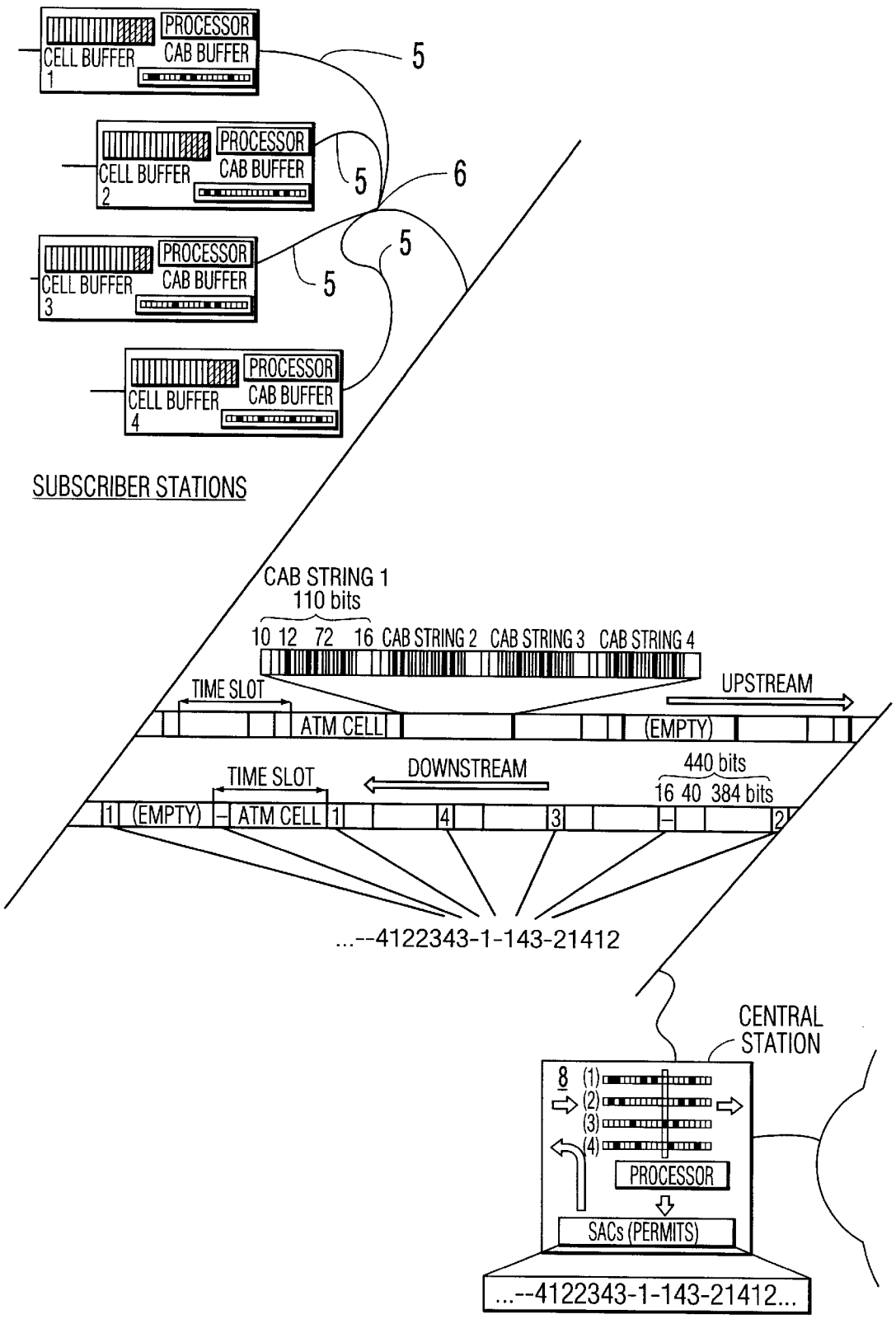
FIG. 4 schematically shows the transmission of the CAB strings to the central station and that of SACs to the subscriber stations.

Downstream, the SACs calculated by the central station are transmitted via the successive time slots, that is to say, at bit locations within the region which, if the time slot contains an ATM cell, forms part of the preamble; even in the case of empty time slots, without an ATM cell, those same bit locations are used. SACs without a local station number ("empty" SACs, indicated in FIG. 4 by "—") are likewise transmitted, in order to form a precise reflection of the (previous) moments of arrival of the ATM cells at the different local stations. Were these empty SACs to be ignored and therefore only non-empty SACs to be transmitted, this would result in an increase in the cell rates, which increase would be detected by access monitoring units, for example in the central station or even further upstream (such an access monitoring unit is described, inter alia, in Patent EP-381275 in the name of Applicant). The SACs are, like the ATM cells, distributed ("broadcasted") over the local station, where the SACs are read. If in a local station the SAC agrees with the station number, the next ("oldest") ATM cell in the cell buffer is released for transmission to the central station, via the next time slot. The SAC value therefore determines which local station is allowed to fill the next time slot with an upstream ATM cell. Which local station is allowed to pick up the ATM cell (424 bits) appearing after the SAC (in the preamble of 16 bits) is determined by an address field in the header (40 bits) of that cell; the content of that address field is therefore entirely unrelated to the SAC field.

It should be noted that where it was proposed, in the above, that the CABs and the SACs not be transmitted via ATM cells, this is nevertheless, in principle, one of the options. It would be conceivable, if bit space could be found for this, for the CABs or the SACs or both to be accommodated in the 40-bits header of the ATM cells. The CABs could then, like the SACs, be transmitted while being distributed over the successive ATM cells (and if a time slot is not filled, at the same bit location established for the purpose as in the case of a filled time slot).

With the aid of the presented system, it is possible, in practice, to bridge a distance of 20 kilometres between the local stations and the central station, said distance hitherto having been approximately 10 kilometres; the delay time over those 20 kilometres is approximately 0.5 msec (the delay time does not refer to the time between the arrival at the local station of an ATM cell to be dispatched upstream and the output of that cell to the upstream network). The system is simple but, owing to the FIFO behaviour, has an excellent performance. It should be noted that it is possible for different subscribers to be connected to the local stations. At this point in time, there are assumed to be 16 local stations to each of which 32 subscribers can be connected. The ATM cells originating from the subscribers are multiplexed in the local station, which functions as a "curb", and are then stored in the (FIFO) cell buffer, until an SAC ("permit") valid for that local station is received from the central station.

The system has initially been designed for an upstream bit rate of 155.52 Mb/s. In the case of a transmission distance of 20 km, the CAB is 72 bits (=the number of time slots between the local station and the central station and back). In this case, the CAB strings of 4 local stations can be sent in one time slot to the central station (see the description of FIG. 4). Assuming there are 16 local stations, this means that four time slots are necessary to be able to dispatch the 16 CAB strings. This means that the capacity available for useful load is 72/(72+4)=approximately 95%.

Alternatively, the system can be employed with an upstream bit rate of 622.08 Mb/s over a distance of 20 km. In that case, the CAB string is 288 bits (the number of time slots between the local station and the central station and back again). Such a CAB string is sent to the central station in one time slot. Assuming there are 16 local stations, this means that 16 time slots are necessary to dispatch the 16 CAB strings. This means that the capacity available for useful load is 288/(288+16)=approximately 95%.

In both cases, the delay time, the time between the moment that an ATM cell arrives at a local station and the moment at which said ATM cell leaves the central station, is found to be approximately 0.5 ms (two and a half times the transmission delay between the two stations).

If the number of local stations is increased from 16 to 32, this means a doubling of the overhead; the capacity for useful load is then approximately 90%.

Finally, it should be noted that the CAB strings can at all times be dispatched to the central station by successive time slots. This makes for simplicity in controlling read-out, although a certain distortion (negligible in practice) occurs (a break in the ATM cell stream). An inherently better solution is for the CAB strings to be transmitted via time slots whose distribution over the time slots between the local stations and central station is as regular as possible.

REFERENCES

European Patent Application EP 94201845.8 in the name of Applicant.

I claim:

1. A transmission method for ATM cells presented by local stations to a central station, and for ATM cells presented by the central station to the local stations, said method comprising the steps of:

storing a cell destined for the central station in a cell buffer of one of the local stations and writing a first character to a register of said local station when the cell destined for the central station is presented in said local station;

writing a second character to the register of said local station when an empty time slot is present in said local station;

periodically reading the register of each of the local stations;

transmitting contents of the read local registers of the local stations to the central station as register codes; and transmitting permit codes from the central station to the local stations based on a location of said first characters in the registers, said permit codes signifying permission to transmit a cell during a specific time slot.

* * * * *